(12) United States Patent
Sekhar et al.

(10) Patent No.: US 9,104,797 B1
(45) Date of Patent: Aug. 11, 2015

(54) EFFICIENT CLOUD-BASED ANNOTATION OF CRASH REPORTS

(71) Applicant: INTUIT INC., Mountain View, CA (US)

(72) Inventors: Sinu Sekhar, Hayward, CA (US); Raymond Chan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 177 days.

(21) Appl. No.: 13/848,489

(22) Filed: Mar. 21, 2013

(51) Int. Cl.
   *G06F 11/00* (2006.01)
   *G06F 11/36* (2006.01)
   *G06F 11/07* (2006.01)

(52) U.S. Cl.
   CPC .......... *G06F 11/362* (2013.01); *G06F 11/0766* (2013.01)

(58) Field of Classification Search
   CPC .................................................. G06F 11/0766
   USPC ................................ 714/1–57; 717/125–135
   See application file for complete search history.

(56) References Cited

U.S. PATENT DOCUMENTS

| 7,343,529 | B1 * | 3/2008 | Klinkner et al. | 714/57 |
| 8,732,674 | B1 * | 5/2014 | Agha | 717/130 |
| 2011/0131561 | A1 * | 6/2011 | Adams et al. | 717/159 |
| 2011/0246964 | A1 * | 10/2011 | Cox et al. | 717/122 |

* cited by examiner

*Primary Examiner* — Bryce Bonzo
*Assistant Examiner* — India Davis
(74) *Attorney, Agent, or Firm* — Park, Vaughan, Fleming & Dowler LLP; Eric Lin

(57) ABSTRACT

One embodiment of the present invention relates to a system for efficiently annotating numerous crash reports originating from multiple instances of an application. Prior to deploying a version of the application, a service receives a file that stores debugging information associated with the version. Next, the service parses the debugging information from the file. The service then converts the debugging information into an object representation in memory and stores the object representation in a database. Next, in response to an instance of the version crashing on a client device, the service receives a crash report from the client device. Then, for each item in the crash report, the service determines whether that item needs to be annotated and, if so, annotates the item.

23 Claims, 5 Drawing Sheets

EFFICIENT CLOUD-BASED ANNOTATION OF CRASH REPORTS

BACKGROUND

Related Art

Despite a software developer company's best efforts, a software application may contain bugs even after the company releases the application into the market. These bugs may cause a user to experience an application crash on her client device. The fact that the application crashes on a client device, outside of the company's development environment, introduces obstacles to finding and fixing the underlying bug.

First, crash reports commonly lack information. Generally, the only evidence of an application crash is a crash report. While some crash reports may help pinpoint the bug's location in the application's source code by providing line numbers in the original source code and method names, others only display the absolute address of the instruction that caused the crash. Without more clues, developers may spend more time and effort chasing down the bug than they otherwise need to.

Second, the crash occurred outside the company's development environment. Hence, the developers may not have a way of conveniently accessing crash reports generated on a user's client device.

Finally, a popular application may generate a high volume of crash reports. If a popular application possesses a bug that causes the application to crash, this crash may repeat on numerous client devices, generating a torrent of crash reports. This torrent may overwhelm any process for handling crash reports.

SUMMARY

One embodiment of the present invention relates to a system for efficiently annotating numerous crash reports originating from multiple instances of an application. Prior to deploying a version of the application, a service receives a file that stores debugging information associated with the version. Next, the service parses the debugging information from the file. The service then converts the debugging information into an object representation in memory and stores the object representation in a database. Next, in response to an instance of the version crashing on a client device, the service receives a crash report from the client device. Then, for each item in the crash report, the service determines whether that item needs to be annotated and, if so, annotates the item.

In some embodiments of the present invention, the debugging information is organized in Debugging with Attributed Record Formats (DWARF) format.

In some embodiments of the present invention, the service does the following when receiving the file that stores the version's debugging information. First, the service provides a directory for uploading files that store debugging information associated with a version of the application. Next, the service detects when the file is uploaded to that directory.

In some embodiments of the present invention, the debugging information may comprise a universally unique identifier (UUID) associated with the version, relative addresses of method invocations within the application, and symbols associated with each relative address. Additionally, the symbols may comprise a line number, a class name, and a method name.

In some embodiments of the present invention, the service does the following when converting the debugging information into an object representation. The service enters into a first map, a key-value pair wherein the key is the relative address and the value is the line number that is associated with the relative address. The service also enters into a second map, a key-value pair wherein the key is also the relative address and the value comprises the class and method names associated with a method invocation located at the relative address.

In some embodiments of the present invention, the service does the following when storing the object representation in a database. The service saves each key-value pair in the first map into an entry in a first database table. Here, each entry is uniquely identified by a combination of the UUID and the relative address. The service then saves each key-value pair in the second map into an entry in a second database table. Here, each entry is also uniquely identified by a combination of the UUID and the relative address. Finally, the service converts the object representation into an Extensible Markup Language (XML) representation and saves the XML representation into a third database table.

In some embodiments of the present invention, the service does the following when receiving a crash report. First, the service receives an annotation request from the client device wherein the annotation request is both in XML format and asynchronously received as a Representational State Transfer (REST) request. Additionally, the annotation request encapsulates the crash report within a character data (CDATA) section.

In some embodiments of the present invention, after receiving the crash report from the client device, the service also obtains a start address from the crash report.

In some embodiments of the present invention, the service determines whether the item needs to be annotated by determining whether the item contains a match to a regular expression.

In some embodiments of the present invention, the service does the following when annotating the item. First, the service obtains an absolute address from the item. Next, the service calculates a relative address from the start address and the absolute address. The service then retrieves the symbols associated with the relative address. Finally, the service replaces the item's absolute address with the symbols.

In some embodiments of the present invention, the service does the following when retrieving the symbols associated with the relative address. First, if a first sorted list is not in the cache, the service populates the first sorted list with entries from the database. The service then performs a binary search on the first sorted list to find a line number associated with a method invocation located at the relative address. Next, if a second sorted list is not in the cache, the service populates the second sorted list with entries from the database. Finally, the service performs a binary search on the second sorted list to find a class name and a method name associated with the method invocation.

DETAILED DESCRIPTION

Figure 1:
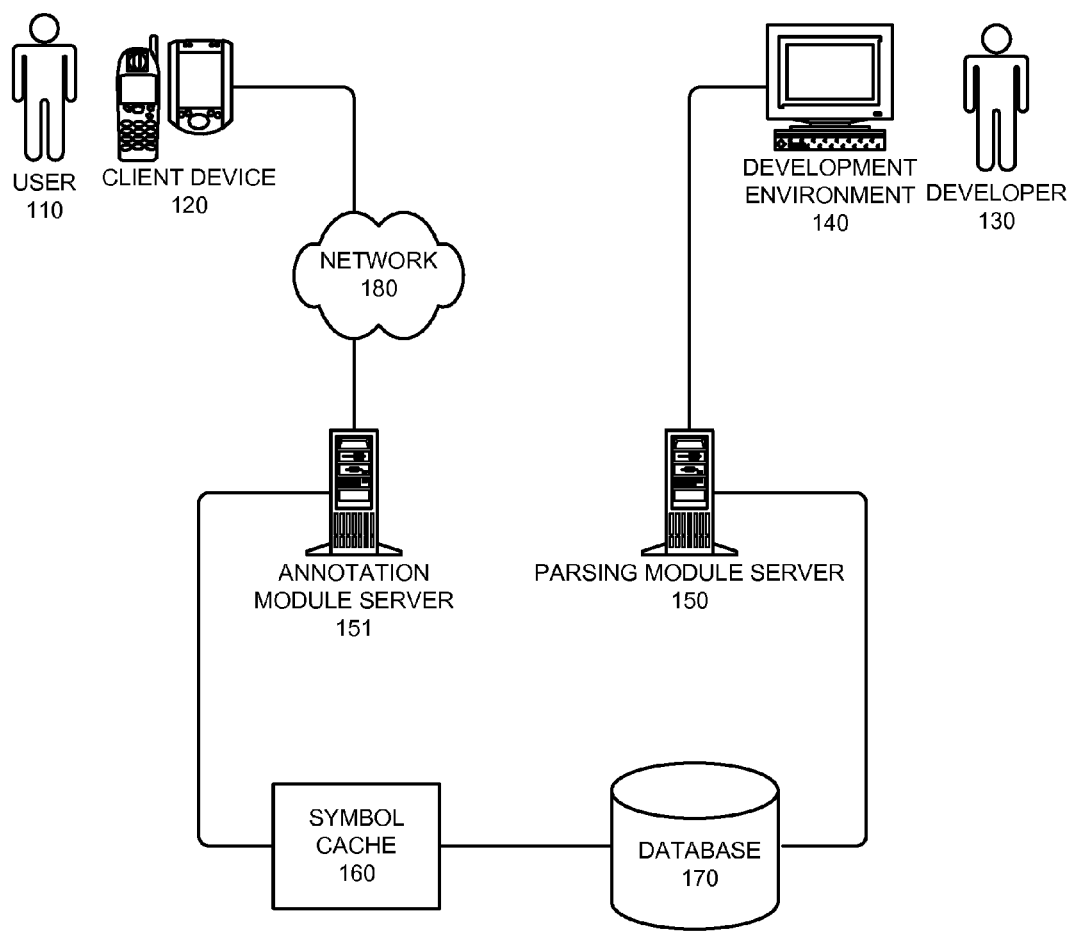
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Some embodiments of the present invention use data structures, search algorithms, and the REST paradigm to provide a cloud-based service for annotating numerous crash reports sent from application instances running on client devices. Annotated crash reports contain more information about the crash, enabling developers of the application to fix the application's bugs more quickly.

In some cases, embodiments of the present invention offer various advantages. Where a user of a client device installs an application onto the client device, an application crash leaves only a crash report behind to document the causes of the crash. By having developers support a cloud-based service that accepts crash reports, embodiments of the present invention enable the client device to submit the crash report to the developers automatically. After the crash report is annotated, developers may use the annotated crash report to quickly diagnose and fix the crash's underlying cause. Thus, embodiments of the present invention promote a faster turnaround time for fixing application bugs by providing an automatic process for handling crash reports with little developer oversight. Furthermore, embodiments of the present invention save developers the trouble of having to manually annotate the crash report themselves via a command item executable by automatically annotating crash reports.

In some cases, embodiments of the present invention may also shorten the time needed to annotate a single crash report. Embodiments of the present invention achieve reduced annotation times by extracting, organizing, storing, and caching debugging information needed to annotate crash reports prior to receiving the crash reports themselves. Thus, even where the volume of incoming crash reports is high, embodiments of the present invention can annotate and respond to all crash reports in near real time. By providing a quick response to crashes, developers may garner good will from users of the application.

In cases where the application is compiled using Apple's Xcode integrated development environment (IDE), the OS X tools used to annotate the application run on the Mac OS platform. Because embodiments of the present invention may be written in Java, embodiments of the present invention may provide the advantage of being platform agnostic. The ability to run the service on a variety of hardware systems may save developers (1) money otherwise spent on Mac OS hardware, and (2) time otherwise spent on retraining system administrators to use the Mac OS platform.

One embodiment of the present invention relates to a system for efficiently annotating numerous crash reports originating from multiple instances of an application. Prior to deploying a version of the application, a service receives a file that stores debugging information associated with the version. Note that by selecting certain options in a compiler, the developer may instruct the compiler to generate the file when the compiler compiles the version of the application from source. For example, when an application developer develops an iPhone application on Xcode, the developer may instruct Xcode to produce a dSYM file during compilation by selecting the "DWARF with dSYM File" setting in the build options. The resulting dSYM file has a .dSYM extension in its name and possesses debugging information associated with the application's executable in DWARF format. The service then converts the debugging information into an object representation in memory and stores the object representation in a database. Next, in response to an instance of the version crashing on a client device, the service receives a crash report from the client device. Then, for each item in the crash report, the service determines whether that item needs to be annotated and, if so, annotates the item.

In some embodiments of the present invention, the debugging information is organized in DWARF format. For example, a dSYM file that is associated with the application contains debugging information about the application's executable in DWARF format.

In some embodiments of the present invention, the service does the following when receiving the file that stores the version's debugging information. First, the service provides a directory for uploading files that store debugging information associated with a version of the application. Note that the service may only expose the directory to the internal network of the company that developed the application. Also, note that the ways in which the service may expose the directory include but are not limited to Hypertext Transfer Protocol (HTTP) and File Transfer Protocol (FTP). Next, the service detects when the file is uploaded to that directory. Note that the ways in which the service may detect a new file include, but are not limited to, a polling cron job that periodically checks the directory for new files and a script that triggers on filesystem event.

In some embodiments of the present invention, the debugging information may comprise a universally unique identifier (UUID) associated with the version, relative addresses of method invocations within the application, and symbols associated with each relative address. Note that each version of the application is identified by a UUID. Also, note that it is important to understand the relationship between the crash report and method invocations made in the application. The bulk of the information provided by a crash report comprises the stack trace. A stack trace provides a list of stack frames that were active at the time of the crash, wherein each item of the stack trace represents a stack frame. Note that the forms a stack trace item may adopt include, but are not limited to, a line in the stack trace and a paragraph in the stack trace. Additionally, because each stack frame is associated with a method invocation, each item in the stack trace is associated with a method invocation. Furthermore, each item in the stack trace is associated with a relative address, wherein a relative address represents the offset between the memory location of the beginning of the application's executable and the memory location of the method invocation. Additionally, the symbols may comprise a method name, a class name, and a line number, wherein (1) the method name is the invoked method's name, (2) the class name is the name of the class the invoked method is a member of, and (3) the line number denotes the line in the original source code where the thread of execution invoked a second method within the invoked method.

In some embodiments of the present invention, the service does the following when converting the debugging information into an object representation. The service enters into a first map, a key-value pair wherein the key is the relative address and the value is the line number that is associated with the relative address. The service also enters into a second map, a key-value pair wherein the key is also the relative address and the value comprises the class and method names associated with a method invocation located at the relative address. Note that if the service is written in Java, the type of both maps may be any Java class that implements the "java.util.Map" interface. Also, note that the object representation may exist in memory. Finally, note that the object representation may comprise a family of Java classes designed to encapsulate the debugging information. For example, the object representation may be an instance of a Java class named "DWARFObject." Here, the DWARFObject instance may contain both maps as member fields.

In some embodiments of the present invention, the service does the following when storing the object representation in a database. The service saves each key-value pair in the first map into an entry in a first database table. For example, the columns of the first database table may comprise a column that stores relative addresses, a column that stores UUIDs, and a column that stores line numbers. Here, each entry is uniquely identified by a combination of the UUID and the relative address. This is because, while multiple versions of the same application may exist, the service saves debugging information from all versions to the same table. Without the UUID, debugging information from one version may override debugging information from another version. The service then saves each key-value pair in the second map into an entry in a second database table. For example, the columns of the second database table may comprise a column that stores relative addresses, a column that stores UUIDs, a column that stores method names, and a column that stores class names. Here, each entry is also uniquely identified by a combination of the UUID and the relative address. Alternatively, the service may save the key-value pairs in both the first and second maps to a single database table. Finally, the service converts the object representation into an Extensible Markup Language (XML) representation and saves the XML representation into a third database table. Finally, the service may move the file to a directory reserved for successfully processed files. The service may then generate an XML formatted success message and send the message via Java Message Service (JMS) to the service logs or some other intended recipient. If some error prevented the service from processing the file, the service may move the file to a directory reserved for unsuccessfully processed files. The service may then generate an XML formatted error message and send the message via JMS to the service logs or some other intended recipient.

In some embodiments of the present invention, the service does the following when receiving a crash report. First, the service receives an annotation request from the client device, wherein the annotation request is both in XML format and asynchronously received as a REST request. Note that the service may utilize an Apache HTTP web server or a Tomcat servlet, among other solutions, to implement the REST API. Additionally, the annotation request encapsulates the crash report within a character data (CDATA) section. Note that, in addition to the original crash report, the annotation request may contain other information relevant to the crash, such as the client device's CPU type.

In some embodiments of the present invention, after receiving the crash report from the client device, the service also obtains a start address from the crash report. Note that the start address represents the memory location of the application's executable in the client device's memory.

In some embodiments of the present invention, the service determines whether the item needs to be annotated by determining whether the item contains a match to a regular expression. Note that because many of the items in the stack trace may already display symbols, some items do not require annotation and the service may stream these items to an output buffer without further modification. For example, the service may apply the regular expression:
[0-9].*0x[0-9A-F] {1,8}.*0x[0-9A-F] {1,8}.*[0-9]
against each item in a stack trace to determine whether the item needs to be annotated. In this example, the following item:
5 libobjc.A.dylib 0x0117f705-[NSObject performSelector:withObject:withObject:]+77
does not produce a match for the regular expression. Thus, the service may send this item to an output buffer without further processing. On the other hand, because the item:
3 ControlFun 0x000078d0 0x1000+26832
does produce a match, the service may retain the item for annotation. Here, "0x000078d0" is the absolute address that needs to be replaced with symbols.

In some embodiments of the present invention, the service does the following when annotating the item. First, the service obtains an absolute address from the item. Next, the service calculates a relative address from the start address and the absolute address. Note that the service may calculate the relative address by subtracting the start address from the absolute address. The service then retrieves the symbols associated with the relative address. Finally, the service replaces the item's absolute address with the symbols. For example, the service may annotate the original item:
3 ControlFun 0x000078d0 0x1000+26832
into:
3 ControlFun (MyCustomClass testFunction2) Line: 540
In this example, the method name is "testFunction2", the class name is "MyCustomClass", and the line number is 540.

In some embodiments of the present invention, the service does the following when retrieving the symbols associated with the relative address. First, if a first sorted list is not in the cache, the service populates the first sorted list with entries from the database. Note that the cache may exist in local system memory. Recall that the first map represents relationships between line numbers and relative addresses. Also, recall that the service stored the first map in the first database table. Now, to minimize database transactions, the service loads these relationships from the first database table into the first sorted list, wherein the first sorted list is sorted by relative address. The service then performs a binary search on the first sorted list to find a line number associated with a method invocation located at the relative address. Next, if a second sorted list is not in the cache, the service populates the second sorted list with entries from the database. Recall that the second map represents relationships between class names, method names, and relative addresses. Also, recall that the service stored the second map in the second database table. Now, to minimize database transactions, the service loads these relationships from the second database table into the second sorted list, wherein the second sorted list is sorted by relative address. Finally, the service performs a binary search on the second sorted list to find a class name and a method name associated with the method invocation.

Computing Environment

FIG. 1 illustrates the computing environment 100 of a software application user 110 in accordance with an embodiment of the present invention. Computing environment 100 includes a number of computer systems, which can include any type of computer system based on a microprocessor, a mainframe computer, a digital signal processor, a portable computing device, a personal organizer, a device controller, or a computational engine within an appliance. More specifically, referring to FIG. 1, computing environment 100 includes user 110, client device 120, developer 130, development environment 140, parsing module server 150, annotation module server 151, symbol cache 160, and database 170.

User 110 may include individuals; groups of individuals; organizations; groups of organizations; computing systems; groups of computing systems or other entities that can interact with computing environment 100.

Client device 120 may include any device that includes computational capability such as PDAs, tablet computers, laptops, desktops, smartphones, and cell phones.

Developer 130 may include an individual software programmer or a team of software programmers.

Development environment 140 may include any device that supports an IDE such as Xcode or a suite of applications that allows a software programmer to develop software.

Both parsing module server 150 and annotation module server 151 may coexist on a single physical server or an advanced computing cluster, or exist on separate physical servers or advanced computing clusters.

Symbol cache 160 may include any type of system for caching data in volatile memory and may physically reside within annotation module server 151 or exist as a separate physical system.

Database 170 may include any type of system for storing data in non-volatile storage. This includes, but is not limited to, relational database management systems, text files, XML files, and spreadsheets. This also includes, but is not limited to, systems based upon magnetic, optical, or magneto-optical storage devices, as well as storage devices based on flash memory and/or battery-backed up memory.

Network 180 may be a private company-wide intranet or the Internet itself.

Note that different embodiments of the present invention may use different system configurations, and are not limited to the system configuration illustrated in computing environment 100.

System

Figure 2:
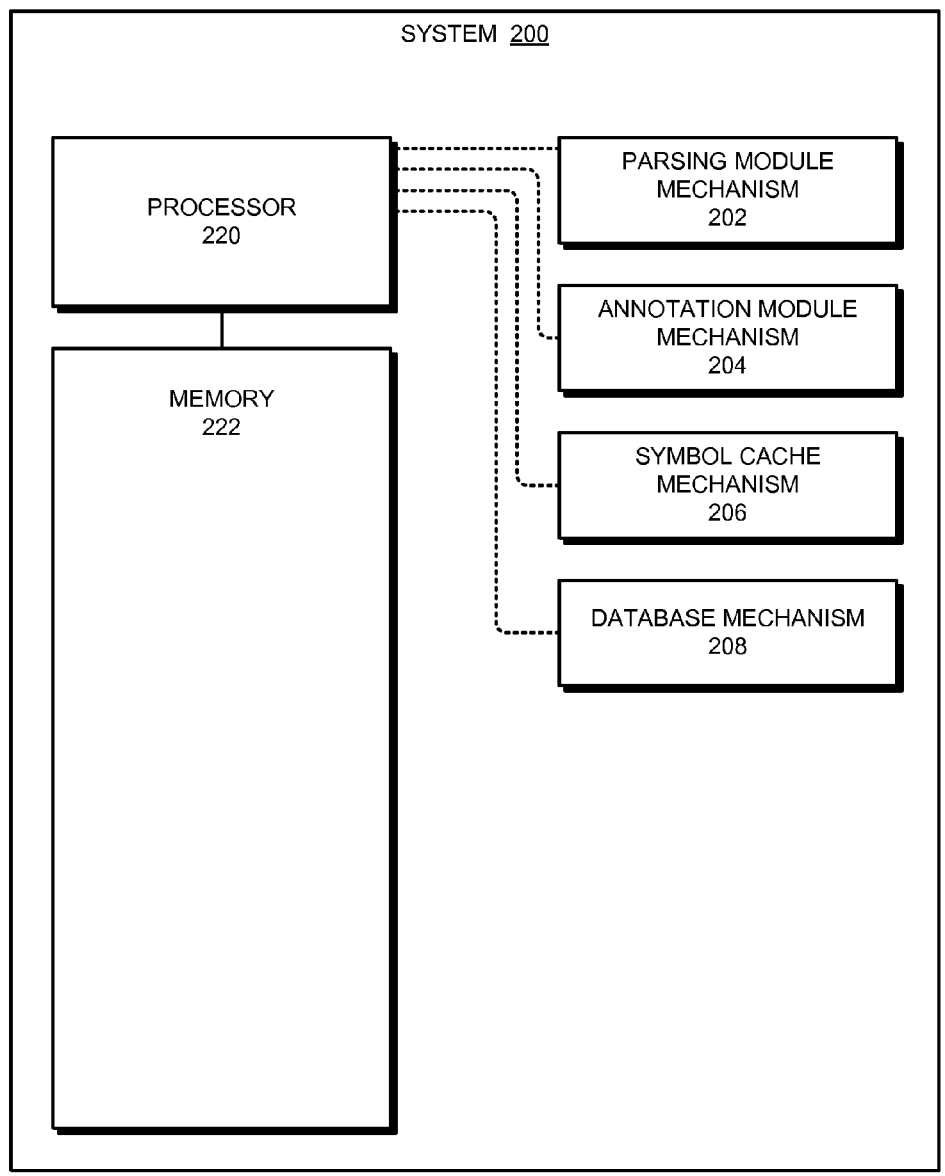
FIG. 2 illustrates a system in accordance with an embodiment of the present invention.

FIG. 2 illustrates a system 200 in accordance with an embodiment of the present invention. As illustrated in FIG. 1, system 200 can comprise annotation module server 151, parsing module server 150, database 170, symbol cache 160, or any combination thereof. System 200 can also include parsing module mechanism 202, annotation module mechanism 204, symbol cache mechanism 206, database mechanism 208, processor 220, and memory 222.

Receiving and Annotating Crash Reports Efficiently

Figure 3:
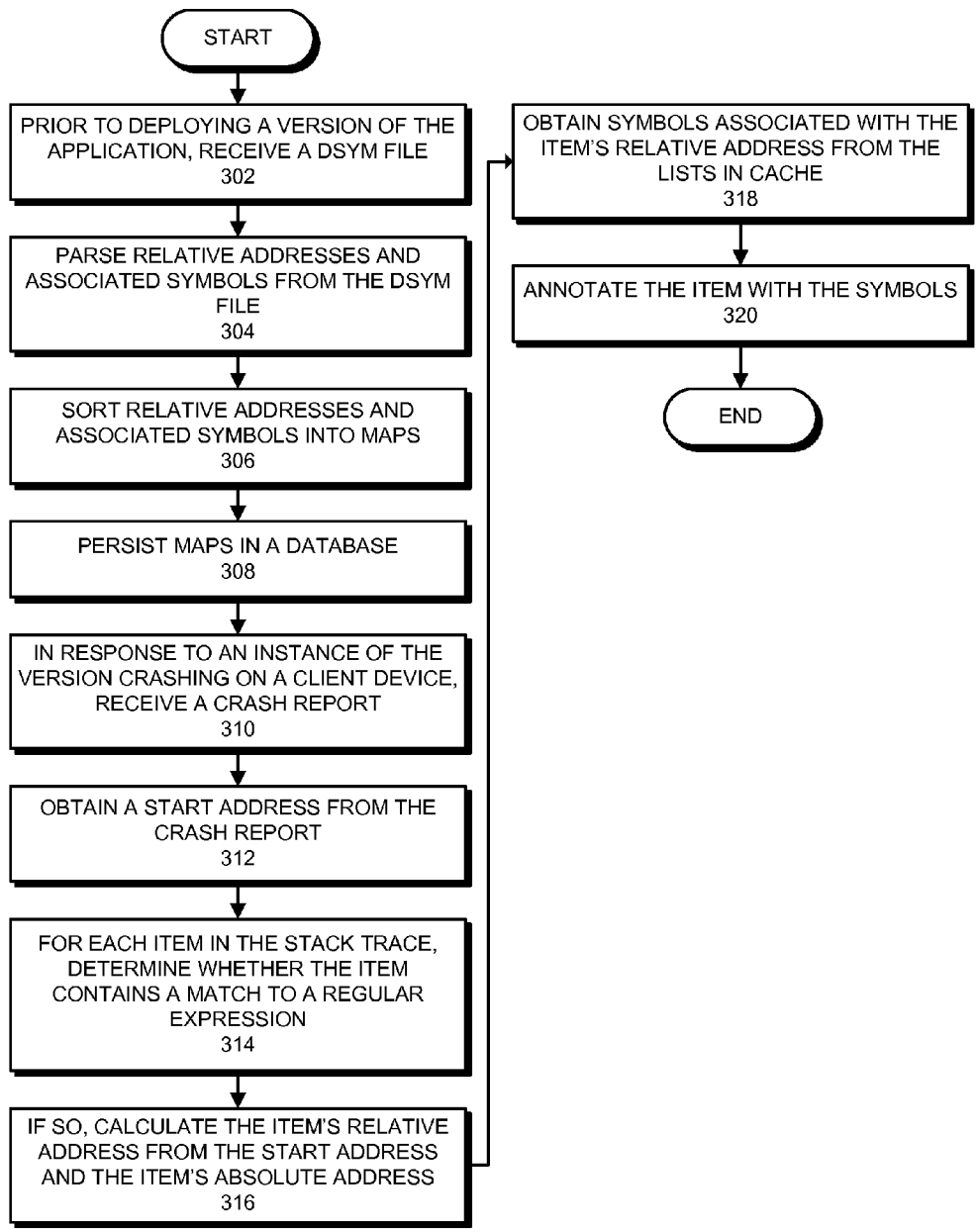
FIG. 3 presents a flow chart illustrating the process of efficiently annotating a high volume of crash reports coming from remote client devices.
Figure 4:
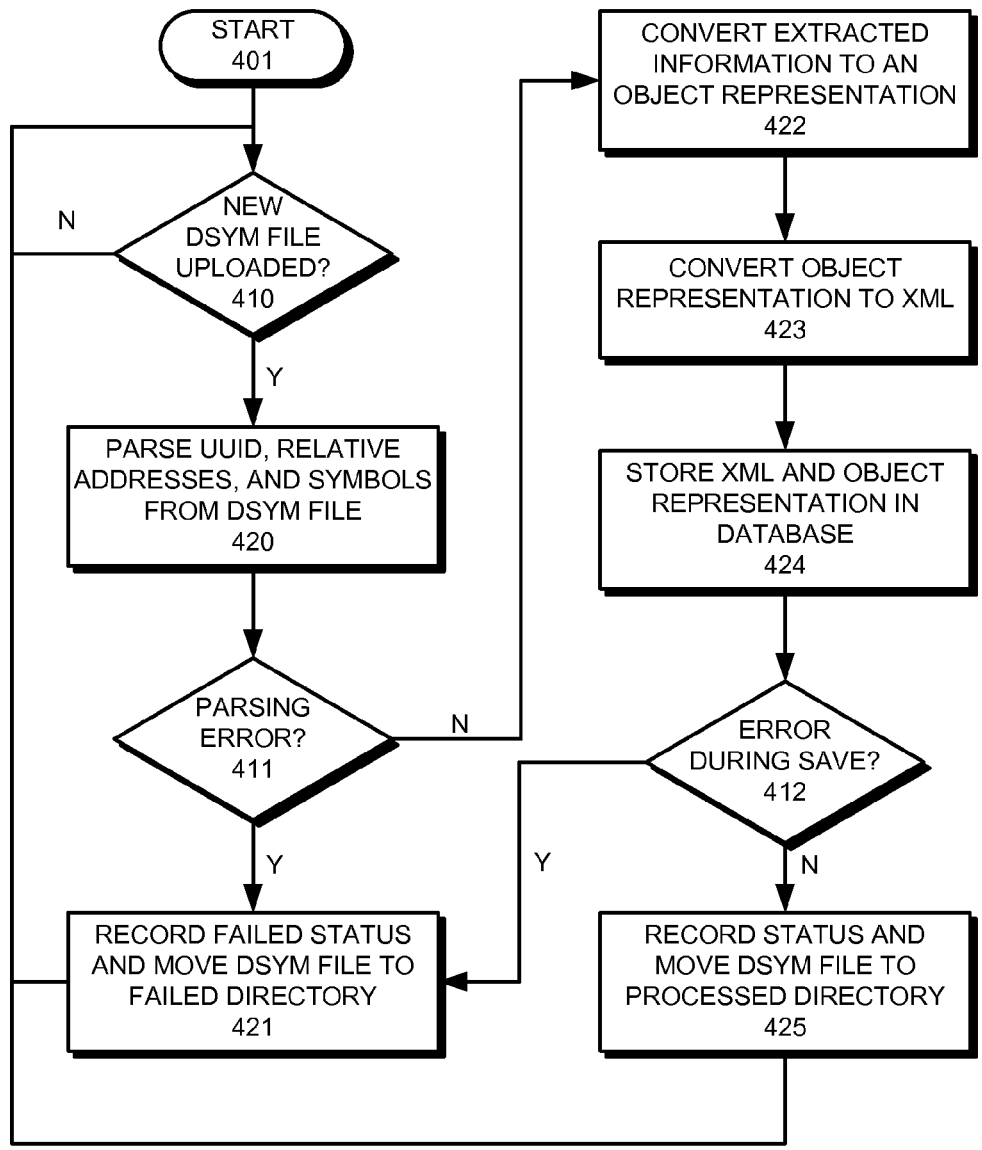
FIG. 4 presents a flow chart illustrating the process of parsing files that store debugging information for an application to prepare the environment for handling crash reports.
Figure 5:
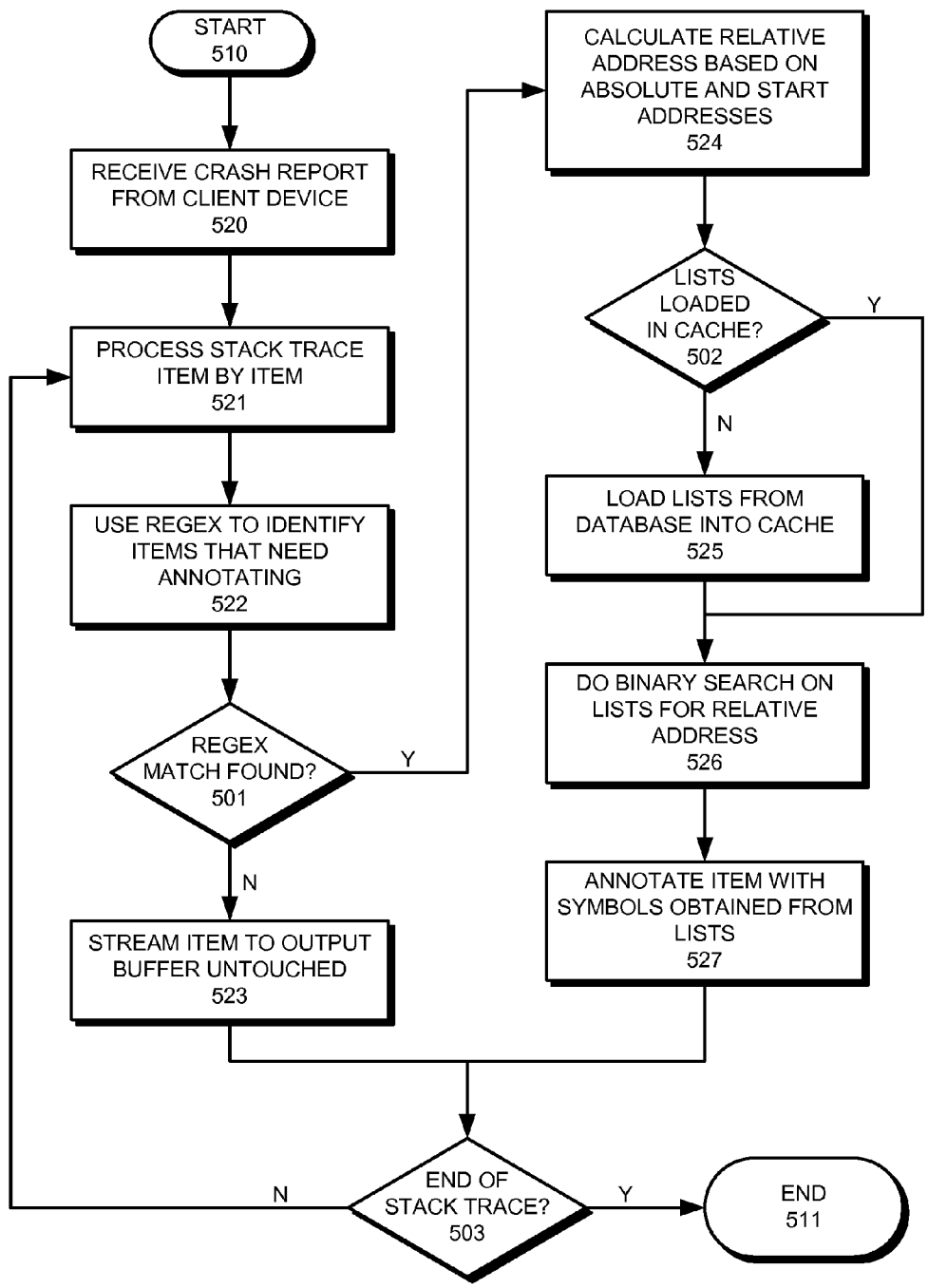
FIG. 5 presents a flow chart illustrating the process of receiving, processing, and annotating a crash report.

The next three figures explain how the combination of a parsing module server and an annotation module server allows a software development company to annotate a high volume of crash reports originating from instances of an application executing on client devices. The flow chart found in FIG. 3 provides a chronological illustration of this process. FIG. 4 focuses on how the parsing module server uses dSYM files provided by a development environment to prepare the environment for annotating crash reports. FIG. 5 focuses on how the annotation module server annotates incoming crash reports.

Note that when an application crashes on a client device, a crash reporter service that runs on the device's operating system creates and sends a crash report to the developer's annotation module servers. The information included in a crash report includes a stack trace of the application at the time of the crash. Here, each item in the stack trace represents a method the application had already invoked when the crash occurred. Some of these items do not provide the name of the invoked method. Rather, these items may only display an absolute address, which is the memory location of the method invocation in the client device. Embodiments of the present invention can replace absolute addresses with the associated method name, the name of the class the method belongs to, and the method invocation's line number in the source code file. Note, however, that the dSYM file maps method names, class names, and line numbers to relative addresses, not absolute addresses. Embodiments of the present invention may calculate the relative address of an item from the item's absolute address and the application's start address, which are both provided by the crash report.

As shown in FIG. 3, embodiments of the present invention operate in two main phases. The first stage occurs when the application is close to release. In the process of developing an application in Xcode, Xcode's compiler may generate a dSYM file as the compiler compiles the application. The dSYM file contains debugging information that, when included in a crash report, may help developers debug the application. Initially, developers of the application may upload the dSYM file to a directory of a parsing module server (operation 302). When the parsing module server detects the upload, the parsing module server first parses debugging information from the file (operation 304). As the parsing module server parses debugging information from the dSYM file, the parsing module server sorts relative addresses and associated symbols from the debugging information into maps (operation 306). Finally, the parsing module server persists the Java objects into database tables (operation 308).

The second stage ensues when a running instance of the application crashes on a client device. At this point, the software development company has released the application into the market. Numerous client devices may be executing an instance of the application. Thus, if one of these instances crashes due to an application bug, many other instances may crash around the same time since all instances have the same bug, producing a large number of crash reports crash repots in a short period of time.

Embodiments of the present invention provide an annotation module server that receives crash reports over the Internet (operation 310). First, the annotation module server extracts a start address from the crash report (operation 312). Note that a start address is the starting memory location of the application in the client device. Next, the annotation module server iterates over each item in the crash report's stack trace. By determining whether the item matches a regular expression, the annotation module server decides whether the item requires annotation (operation 314). If a match is found, the annotation module server extracts the item's absolute address from the crash report. Then, the annotation module server calculates the relative address from the absolute address and the start address (operation 316). After making sure that the debugging information is loaded from the database into lists in the cache, the annotation module server searches the lists for debugging information associated with the relative address (operation 318). Finally, the annotation module server annotates the item with the method name, the class name, and the line number (operation 320).

Processing dSYM Files

FIG. 4 illustrates how a parsing module server accepts dSYM files provided by development environment 140 to prepare the environment for handling crash reports.

In the beginning (terminator 401), the parsing module server periodically checks a local folder for recently uploaded dSYM files (decision 410). For example, suppose a software development firm that develops applications for the iPhone is about to release a new version of a popular third-party application for the iPhone. In the days before the release, an Xcode compiler, which runs on development environment 140, compiles the new version of the application. During compilation, the Xcode also produces a dSYM file that is associated with the application. Meanwhile, parsing module server 150, which hosts parsing module mechanism 202, exposes a directory within the company network for receiving dSYM files. A polling process on the server, which is started via a scheduler, constantly checks the "/pending" directory for recently uploaded dSYM files. As soon as developer 130 uploads the dSYM file into the directory, parsing module server 150 will detect the dSYM file.

Next, the parsing module server extracts debugging information from the dSYM file. The debugging information includes header information such as a UUID that uniquely identifies the version and symbols associated with relative addresses, wherein each symbol is associated with a line number, a method name, and a class name (operation 420). Returning to the above example, because the dSYM file is a binary file, parsing module server 150 parses out debugging information with byte-level precision. Any errors in calculating offsets will cause parsing module server 150 to extract the debugging information incorrectly, rendering the debugging information corrupted and unusable. Suppose that parsing module mechanism 202 makes use of the Java Platform. Additionally, Apple's Mach-O file format reference reveals how debugging information is stored with the dSYM file. Using both the reference and the Java Platform, parsing module server 150 instantiates an object of the type "java.io.RandomAccessFile" and uses the object to read sections of data from the dSYM file. Focusing on the symbol table and the debug_item section of the dSYM file, parsing module server 150 uses the file pointer to (1) find locations of relative addresses of interest in the dSYM file, (2) extract the relative addresses from the dSYM file, and (3) extract line numbers, method names, and class names associated with each relative address from the dSYM file.

If an errors occurs while parsing module server 150 parses the dSYM file (decision 411), parsing module server 150 records this error and moves the dSYM file into a failure directory (operation 421). Returning to the above example, suppose that the dSYM file uploaded by developer 130 is corrupted due to an incomplete upload. After parsing module server 150's attempt to parse the dSYM file fails, parsing module server 150 records this error in database 170 and moves the dSYM file to the "/failure" directory for future diagnosis.

On the other hand, if the parsing succeeds (decision 411), the parsing module server converts the extracted debugging information into an object representation (operation 422). Returning to the above example, parsing module server 150 creates an instance of the MachObject class, which is a Java class, to encapsulate the debugging information. All instances of the MachObject class possess child objects, including those to hold header information such as the UUID. The child objects also include a line-number-map, which is a Java object that implements the Map interface and which maps relative addresses to associated line numbers. The child objects also include a method-name-map, which is a Java object that implements the "java.util.Map" interface and which maps relative addresses to associated class and method names. Note that, in both maps, the relative address acts as the key in the key-value pair.

Next, the parsing module server converts the object representation into an XML representation (operation 423). Returning to the above example, parsing module server 150 uses Java Architecture for XML Binding (JAXB) to serialize the MachObject into an XML document.

Next, the parsing module server stores both the object representation and the XML representation in a database (operation 424). Returning to the above example, parsing module server 150 persists all entries from the method-name-map into a first database table and persists all entries of the line-number-map into a second database table. Note that the entries in both the first database table and the second database table are uniquely identified by the combination of the UUID and the relative address of the corresponding map entry. This way, if multiple versions of the same application have their debugging information extracted and persisted to the same database table, entries specific to a newer version of the application will not overwrite entries specific to an older version. Parsing module server 150 also stores the XML representation into a third database table.

If storing the debugging information in a database results in an error (decision 412), the error is recorded and the dSYM file is moved to the "/failed" directory (operation 421). On the other hand, if storing the debugging information in the database is successful, the parsing module server moves the dSYM file to the "/processed" directory (operation 425).

Annotating Crash Reports

FIG. 5 illustrates how annotation module server 151 receives and annotates crash reports when they arrive from client devices.

First, an annotation module server receives a crash report from a client device, where an application instance has crashed (operation 520). Returning to the previous example in FIG. 4, assume that the software development company releases a version of the iPhone application to the market. Subsequently, many consumers download and install the new version of the iPhone application on their iPhones. One of these consumers, user 110, installs the application on client 120. Meanwhile, annotation module server 151 uses a Tomcat servlet to provide a REST-based service that accepts crash reports from remote client devices. When the application crashes on client 120, client 120 generates a crash report. Client 120 then builds an XML document called a symbolication request and inserts the crash report into a CDATA element of the symbolication request. Next, client 120 sends the symbolication request across network 180 to annotation module server 151. Finally, annotation module server 151 extracts the crash report from the symbolication request.

Next, the annotation module server processes each item of the crash report's stack trace (operation 521). Returning to the above example, annotation module server 151 uses an object of the type "java.io.BufferedReader" to read the crash report's stack trace.

Next, the annotation module server uses regular expressions to determine whether an item needs to be annotated (operation 522). If an item contains a match to a regular expression (decision 501), the annotation module server retains the item for annotation. Otherwise, the annotation module server streams the item to an output buffer untouched (operation 523). Returning to the above example, annotation module server 151 uses classes in the "java.util.regex" Java package to apply the regular expression: "[0-9].*0x[0-9A-F]{1,8}.*0x[0-9A-F]{1,8}.*[0-9]" to each item in the stack trace. If there is no match, annotation module server 151 streams the item to an output buffer before proceeding to the next item in the stack trace. If there is a match, annotation module server 151 retains the item for annotation.

Next, the annotation module server calculates the item's relative address using the item's absolute address and the application's start address (operation 524). Returning to the above example, annotation module server 151 already knows the application's start address from the crash report. Next, annotation module server 151 extracts the item's absolute address from the item itself. Annotation module server 151 then subtracts the start address from the absolute address to calculate the item's relative address.

Next, the annotation module server determines whether a cache is populated with relative addresses and associated symbols specific to the application's version (decision 502). If not, the annotation module server loads the relative addresses and symbols from the database (operation 525). Returning to the above example, rather than obtaining debugging information from database 170 every time an item is annotated, annotation module server 151 obtains debugging information from cache 160. If the cache is empty, annotation module server 151 loads all relative addresses and line numbers specific to the application's version from database 170 into cache 160's line-number-list, which is an object that implements the "java.util.list" interface. Additionally, annotation module server 151 loads all relative addresses, method names, and class names specific to the application's version from database 170 into cache 160's method-name-list, which is also an object that implements the "java.util.list" interface. Note that both the line-number list and the method-name-list are sorted by relative address.

Next, the annotation module server performs a binary search on both lists to find the line number, the method name, and the class name that are associated with the relative address (operation 526). Returning to the above example, because both lists are sorted by relative address, annotation module server 151 can use a binary search algorithm to find the entry that matches the item's relative address in either list. Once annotation module server 151 locates the matching entry in both lists, annotation module server 151 retrieves the line number from the entry obtained from the line-number-list and retrieves the method name and the class name from the entry obtained from the method-name-list.

Finally, the annotation module server annotates the item with the symbols obtained from the lists in the cache (operation 527). If that item was the last item in the stack trace (decision 503), annotation module server 151 finishes annotating the crash report and proceeds to process the next crash report (terminator 511). Otherwise, annotation module server 151 continues to the next item in the crash report (operation 521). Returning to the above example, annotation module server 151 annotates the item with the line number, the method name, and the class name. Then, annotation module server 151 sends the item to the output buffer Annotation module server 151 then moves on to the next item in the stack trace. After annotation module server 151 annotates the final item in the stack trace, annotation module server 151 builds an XML document called a symbolication response. Next, annotation module server 151 writes the annotated crash report, which is stored in the output buffer, into a character data node in the symbolication response. Finally, annotation module server 151 sends the symbolication response back to client 120 over network 180.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for annotating crash reports originating from one or more instances of an application, the method comprising:
   at a first server, prior to deploying a version of the application:
      receiving a file that stores debugging information associated with the version, wherein the debugging information comprises relative addresses of method invocations within the application and symbols associated with each relative address, wherein the symbols comprise a line number, a class name, and a method name;
      parsing the debugging information from the file;
      converting the debugging information into an object representation in memory; and
      storing the object representation in a database; and
   at a second server, in response to an instance of the version crashing on a client device:
      receiving a stack trace originating from an instance of the version of the application executing on the client device; and
      for each item in the stack trace:
         determining whether the item needs to be annotated; and
         if so, determining a relative address that is associated with the item and annotating the item with at least one of a line number associated with the relative address, a class name associated with the relative address, and a method name associated with the relative address;
   wherein the second server is one of the first server and a different server.

2. The computer-implemented method of claim 1, wherein debugging information is organized in Debugging with Attributed Record Formats (DWARF) format.

3. The computer-implemented method of claim 1, wherein receiving the file that stores the debugging information associated with the version comprises:
   providing a directory for uploading files that store debugging information associated with a version of the application; and
   detecting when the file is uploaded to the directory.

4. The computer-implemented method of claim 1, wherein the debugging information further comprises a universally unique identifier (UUID) associated with the version.

5. The computer-implemented method of claim 4, wherein converting the debugging information into an object representation in memory comprises:
   for each relative address:
      entering into a first map, a key-value pair comprising the relative address as the key and a line number associated with a method invocation located at the relative address as the value; and
      entering into a second map, a key-value pair comprising the relative address as the key and a combination of a class name and a method name associated with the method invocation as the value.

6. The computer-implemented method of claim 5, wherein storing the object representation in a database comprises:
   for each key-value pair in the first map:
      saving the key-value pair into an entry in a first database table, wherein the entry is uniquely identified by a combination of the UUID and the relative address;
   for each key-value pair in the second map:
      saving the key-value pair into an entry in a second database table, wherein the entry is uniquely identified by a combination of the UUID and the relative address; and
      converting the object representation into an Extensible Markup Language (XML) representation; and
   saving the XML representation into a third database table.

7. The computer-implemented method of claim 6, wherein receiving a stack trace from the client device comprises receiving an annotation request from the client device wherein the annotation request:
   is asynchronously received as a Representational State Transfer (REST) request;
   is in XML format; and
   encapsulates the stack trace within a character data section.

8. The computer-implemented method of claim 6, wherein after receiving the stack trace from the client device, the method further comprises obtaining a start address from the stack trace.

9. The computer-implemented method of claim 8, wherein determining whether the item needs to be annotated comprises determining whether the item contains a match to a regular expression.

10. The computer-implemented method of claim 9, wherein determining the relative address that is associated with the item and annotating the item with at least one symbol associated with the relative address comprises:
   obtaining an absolute address from the item;
   calculating a relative address from the start address and the absolute address;
   retrieving the symbols associated with the relative address; and
   replacing the item's absolute address with the symbols.

11. The computer-implemented method of claim 10, wherein retrieving the symbols associated with the relative address comprises:
   if a first sorted list is not in the cache, populating the first sorted list with entries from the database;
   performing a binary search on the first sorted list to find a line number associated with a method invocation located at the relative address;
   if a second sorted list is not in the cache, populating the second sorted list with entries from the database; and
   performing a binary search on the second sorted list to find a class name and a method name associated with the method invocation.

12. A non-transitory computer-readable storage medium storing instructions that when executed by a computer cause the computer to perform a method for annotating crash reports originating from one or more instances of an application, the method comprising:
   at a first server, prior to deploying a version of the application:
      receiving a file that stores debugging information associated with the version, wherein the debugging information comprises relative addresses of method invocations within the application and symbols associated with each relative address, wherein the symbols comprise a line number, a class name, and a method name;
      parsing the debugging information from the file;
      converting the debugging information into an object representation in memory; and
      storing the object representation in a database; and
   at a second server, in response to an instance of the version crashing on a client device:
      receiving a stack trace originating from an instance of the version of the application executing on the client device; and
      for each item in the stack trace:
         determining whether the item needs to be annotated; and
         if so, determining a relative address that is associated with the item and annotating the item with at least one of a line number associated with the relative address, a class name associated with the relative address, and a method name associated with the relative address;
   wherein the second server is one of the first server and a different server.

13. The computer-program product of claim 12, wherein debugging information is organized in Debugging with Attributed Record Formats (DWARF) format.

14. The computer-program product of claim 12, wherein receiving the file that stores the debugging information associated with the version comprises:
   providing a directory for uploading files that store debugging information associated with a version of the application; and
   detecting when the file is uploaded to the directory.

15. The computer-program product of claim 12, wherein the debugging information further comprises a universally unique identifier (UUID) associated with the version.

16. The computer-program product of claim 15, wherein converting the debugging information into an object representation in memory comprises:
   for each relative address:
      entering into a first map, a key-value pair comprising the relative address as the key and a line number associated with a method invocation located at the relative address as the value; and
      entering into a second map, a key-value pair comprising the relative address as the key and a combination of a class name and a method name associated with the method invocation as the value.

17. The computer-program product of claim 16, wherein storing the object representation in a database comprises:
for each key-value pair in the first map:
saving the key-value pair into an entry in a first database table, wherein the entry is uniquely identified by a combination of the UUID and the relative address;
for each key-value pair in the second map:
saving the key-value pair into an entry in a second database table, wherein the entry is uniquely identified by a combination of the UUID and the relative address; and
converting the object representation into an XML representation; and saving the XML representation into a third database table.

18. The computer-program product of claim 17, wherein receiving a stack trace from the client device comprises receiving an annotation request from the client device wherein the annotation request:
is asynchronously received as a Representational State Transfer (REST) request;
is in XML format; and
encapsulates the stack trace within a character data section.

19. The computer-program product of claim 17, wherein after receiving the stack trace from the client device, the computer-program mechanism further includes instructions for obtaining a start address from the stack trace.

20. The computer-program product of claim 19, wherein determining whether the item needs to be annotated comprises determining whether the item contains a match to a regular expression.

21. The computer-program product of claim 20, wherein determining the relative address that is associated with the item and annotating the item with at least one symbol associated with the relative address comprises:
obtaining an absolute address from the item;
calculating a relative address from the start address and the absolute address;
retrieving the symbols associated with the relative address; and
replacing the item's absolute address with the symbols.

22. The computer-program product of claim 21, wherein retrieving the symbols associated with the relative address comprises:
if a first sorted list is not in the cache, populating the first sorted list with entries from the database;
performing a binary search on the first sorted list to find a line number associated with a method invocation located at the relative address;
if a second sorted list is not in the cache, populating the second sorted list with entries from the database; and
performing a binary search on the second sorted list to find a class name and a method name associated with the method invocation.

23. A computer system, comprising:
a processor;
memory; and
a program module, wherein the program module is stored in the memory and configured to be executed by the processor, the program module including instructions for annotating crash reports originating from one or more instances of an application, wherein the instructions include:
instructions for, prior to deploying a version of the application:
receiving a file that stores debugging information associated with the version, wherein the debugging information comprises relative addresses of method invocations within the application and symbols associated with each relative address, wherein the symbols comprise a line number, a class name, and a method name;
parsing the debugging information from the file;
converting the debugging information into an object representation in memory; and
storing the object representation in a database; and
instructions for, in response to an instance of the version crashing on a client device:
receiving a stack trace originating from an instance of the version of the application executing on the client device; and
for each item in the stack trace:
determining whether the item needs to be annotated; and
if so, determining a relative address that is associated with the item and annotating the item with at least one of a line number associated with the relative address, a class name associated with the relative address, and a method name associated with the relative address.

* * * * *